(12) United States Patent
Hwang

(10) Patent No.: US 9,092,843 B2
(45) Date of Patent: Jul. 28, 2015

(54) INSPECTION METHOD

(75) Inventor: Bong-Ha Hwang, Seoul (KR)

(73) Assignee: KOH YOUNG TECHNOLOGY INC., Seoul (KR)

( * ) Notice: Subject to any disclaimer, the term of this patent is extended or adjusted under 35 U.S.C. 154(b) by 847 days.

(21) Appl. No.: 13/299,977

(22) Filed: Nov. 18, 2011

(65) Prior Publication Data

US 2012/0128231 A1    May 24, 2012

(30) Foreign Application Priority Data

Nov. 20, 2010   (KR) .................... 10-2010-0115919

(51) Int. Cl.
*G06T 7/00* (2006.01)

(52) U.S. Cl.
CPC ....... *G06T 7/001* (2013.01); *G06T 2207/30141* (2013.01)

(58) Field of Classification Search
CPC ............. G06T 2207/30148; G06T 7/001; G06T 7/0004; G06T 7/0002; G06T 2207/30141; G06T 7/0085; G06T 7/0008; G06T 2207/30108; G06T 2207/30164; G01N 21/9501; G01N 21/95607; G01N 21/956; G01N 21/95; G01N 2021/95676; G01N 2021/8861
USPC ......................................... 382/141, 147, 152
See application file for complete search history.

(56) References Cited

U.S. PATENT DOCUMENTS

| 5,774,574 | A | 6/1998 | Hoki |
| 7,099,392 | B2 * | 8/2006 | Kim .................. 375/240.16 |
| 2009/0202137 | A1 * | 8/2009 | Shinoda et al. .......... 382/145 |
| 2010/0092041 | A1 | 4/2010 | Kim et al. |
| 2010/0246931 | A1 * | 9/2010 | Kim et al. ................ 382/141 |
| 2011/0052076 | A1 * | 3/2011 | Yashiro .................... 382/190 |

FOREIGN PATENT DOCUMENTS

| CN | 101852745 | 10/2010 |
| JP | 03-175343 | 7/1991 |
| JP | 2005-196506 | 7/2005 |
| JP | 2008-185514 | 8/2008 |
| JP | 2009-223220 | 10/2009 |
| JP | 2009-260185 | 11/2009 |
| JP | 2010-237210 | * 10/2010 |
| KR | 10-2011-0105512 | 9/2011 |

OTHER PUBLICATIONS

Kim et al, JP-2010-237210, Oct. 2010, JPO machine translation, 1-20.*

* cited by examiner

*Primary Examiner* — Edward Park
(74) *Attorney, Agent, or Firm* — Kile Park Reed & Houtteman PLLC

(57) ABSTRACT

In order to inspect a board, firstly, a measurement area is set on a board, and reference data and measurement data of the measurement area are acquired. Then, a plurality of feature blocks is established by a block unit so as to include a predetermined shape in the measurement area, and a merged block is established by merging feature blocks overlapped in the feature blocks. Thereafter, a distortion degree is acquired by comparing reference data and measurement data corresponding to a feature block except for the merged block and/or the merged block, and the distortion degree is compensated for, to set an inspection area in the target measurement area. Thus, an inspection area, in which distortion is compensated for, may be correctly set.

12 Claims, 3 Drawing Sheets

INSPECTION METHOD

CROSS REFERENCE TO RELATED APPLICATION

This application claims priority from and the benefit of Korean Patent Applications No. 2010-115919 filed on Nov. 20, 2010, which is hereby incorporated by reference for all purposes as if fully set forth herein.

BACKGROUND OF THE INVENTION

1. Field of the Invention

Exemplary embodiments of the present invention relate to an inspection method. More particularly, exemplary embodiments of the present invention relate to an inspection method for a board.

2. Discussion of the Background

Generally, at least one printed circuit board (PCB) is employed in an electronic device, and various circuit elements such as a circuit pattern, a connection pad part, a driver chip electrically connected to the connection pad part, etc. are mounted on the PCB.

A shape measurement apparatus is typically used to check whether the various circuit elements are formed or configured good or not on the printed circuit board.

In a conventional shape measurement apparatus, a predetermined inspection area is set to inspect whether circuit elements are formed good or not in the inspection area. In a conventional method of setting an inspection area, an area, in which circuit elements are theoretically located, is simply set as an inspection area.

When the inspection area is set at a correct location, a measurement of a desired circuit element is performed well. However, in a measurement target such as a PCB, distortion such as warpage, contortion, etc. of a base board may be generated. Thus, in the conventional method of setting an inspection area, the inspection area is not correctly set at a desired location, and a location corresponding to an image acquired in a camera of an image capturing part is a little different from a location where a circuit element actually exists.

Thus, an inspection area is required to set to compensate for the distortion of the measurement target.

SUMMARY OF THE INVENTION

Exemplary embodiments of the present invention provide an inspection method capable of setting an inspection area in which distortion of a measurement target is compensated for, and correctly selecting a feature object, in which misidentification probability is removed Additional features of the invention will be set forth in the description which follows, and in part will be apparent from the description, or may be learned by practice of the invention.

An exemplary embodiment of the present invention discloses an inspection method. The inspection method includes setting a measurement area on a board, acquiring reference data and measurement data of the measurement area, establishing a plurality of feature blocks by a block unit so as to include a predetermined shape in the measurement area, establishing a merged block by merging feature blocks overlapped in the feature blocks, acquiring a distortion degree by comparing reference data and measurement data corresponding to a feature block except for the merged block and/or the merged block, and compensating for the distortion degree to set an inspection area in the target measurement area.

In an exemplary embodiment, the predetermined shape in the measurement area may include at least one of a bent pattern and a hole pattern.

Establishing a plurality of feature blocks by a block unit so as to include a predetermined shape in the measurement area may includes finding a location of a corner of a bent circuit pattern corresponding to the predetermined shape, and establishing a margin area of the corner of the bent circuit pattern and establishing the feature blocks defined by the established margin area. Establishing a merged block by merging feature blocks overlapped in the feature blocks may include merging margin areas of the overlapped feature blocks, and establishing the merged block by extracting a minimum quadrangle of the merged margin areas.

Acquiring a distortion degree by comparing reference data and measurement data corresponding to a feature block except for the merged block and/or the merged block may include extracting a comparison block from the feature block except for the merged block and/or the merged block, and acquiring a distortion degree by comparing the reference data and the measurement data corresponding to the extracted comparison block with each other.

In an exemplary embodiment, the extracted comparison block may be plural, and the comparison blocks may be extracted to be evenly distributed in the measurement area.

In another exemplary embodiment, the extracted comparison block may be plural, and a greater score may be given to the feature block or the merged block, which has a smaller shape difference between the reference data and the measurement data, among the feature block except for the merged block and/or the merged block. The comparison block may be extracted based on the score.

The distortion degree may be acquired as a quantified conversion formula between the reference data and the measurement data corresponding to the comparison block, and the quantified conversion formula may be determined by using at least one of a location change, a slope change, a size change and a transformation degree, which are acquired by comparing the reference data and the measurement data corresponding to the comparison block with each other.

In case that the number of the merged feature blocks is greater than or equal to a predetermined reference number, the merged block acquired by the merged feature blocks may be excluded from extracting the comparison block.

The predetermined shape of each feature block may have a two-dimensional identifier so that misidentification probability due to a surrounding shape is removed.

According to the present invention, feature blocks are established by a block unit to include a predetermined shape in a measurement area FOV set on a board, and a merged block is established by merging overlapped feature blocks among the feature blocks, thereby acquiring a distortion degree by comparing reference data RI and measurement data PI and compensating for the distortion degree. Therefore, an inspection area may be more correctly set.

In addition, the overlapped feature blocks are merged to remove misidentification probability between similar shapes. Thus, a feature object may be more effectively selected.

In addition, after feature blocks are evenly distributed on a board, a distortion degree is acquired and compensated for, to thereby more correctly set an inspection area.

In addition, a work such as an inspection of components may be performed based on the measurement area FOV set as described above, to thereby more correctly judge whether the board is good or bad.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
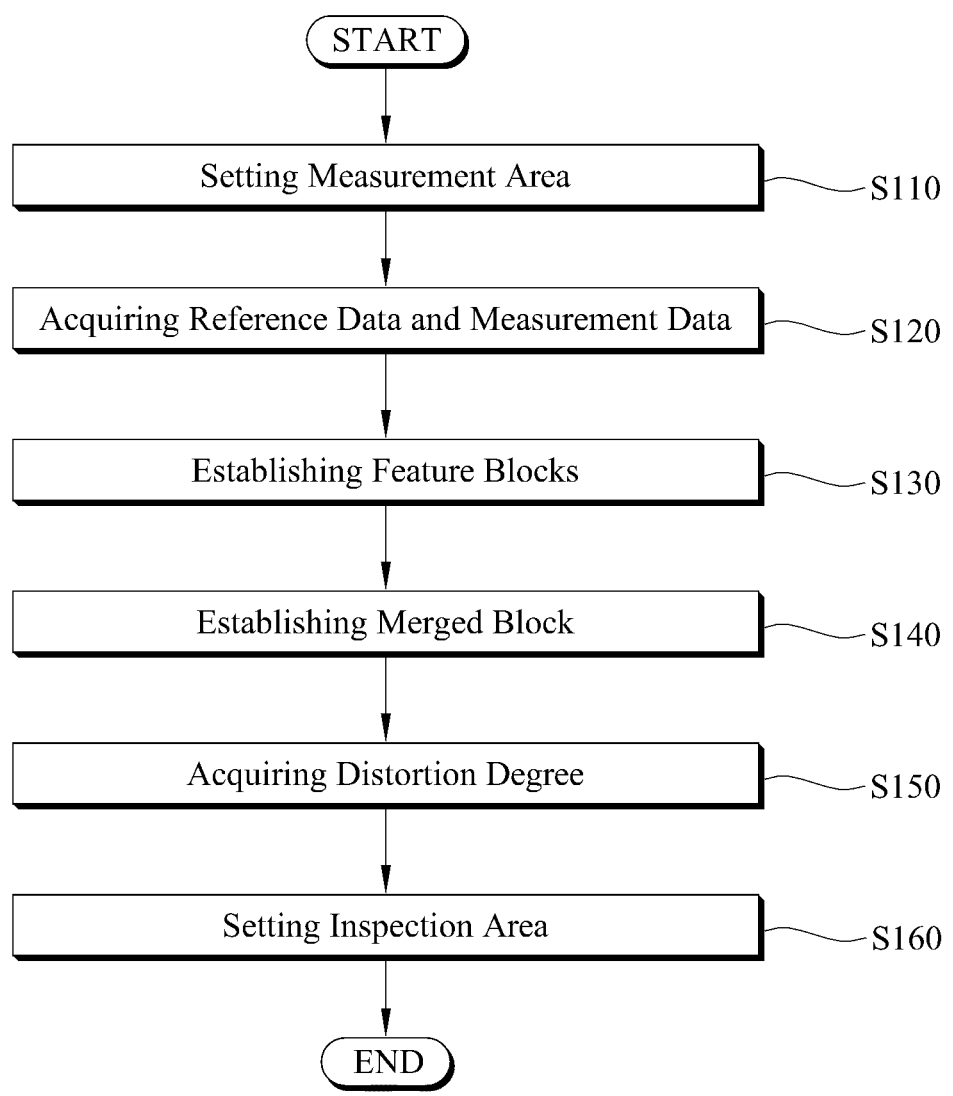
FIG. 1 is a flow chart illustrating an inspection method according to an exemplary embodiment of the present invention.

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings.

Figure 2:
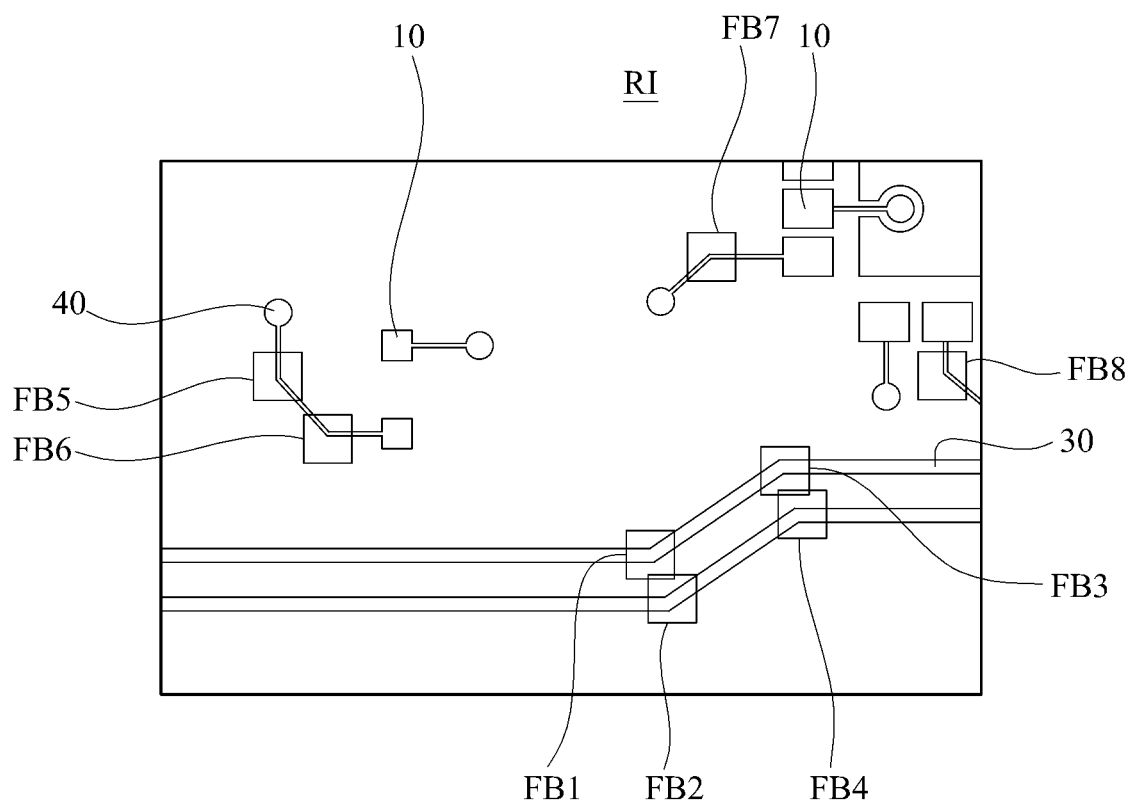
FIG. 2 is a plan view illustrating reference data in the inspection method shown in FIG.
Figure 3:
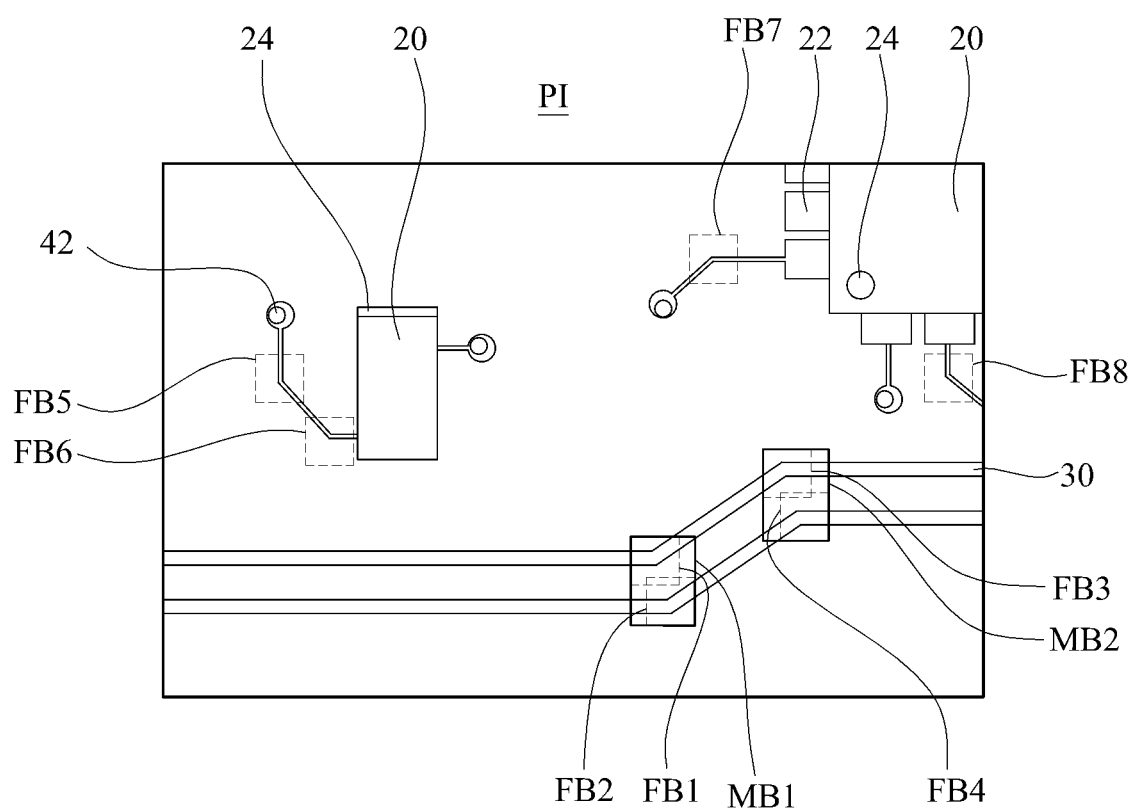
FIG. 3 is a plan view illustrating measurement data in the inspection method shown in FIG. 1.

FIG. 1 is a flow chart illustrating an inspection method according to an exemplary embodiment of the present invention. FIG. 2 is a plan view illustrating reference data in the inspection method shown in FIG. 1. FIG. 3 is a plan view illustrating measurement data in the inspection method shown in FIG. 1.

Referring to FIGS. 1 to 3, in order to set an inspection area in which distortion is compensated for according to an exemplary embodiment of the present invention, firstly a measurement area FOV is set on a board in step of S110.

The measurement area FOV indicates a predetermined area that is set on the board so as to inspect whether the board is bad or not, and may be defined, for example, based on a "field of view" of a camera installed in an inspection apparatus such as a three-dimensional shape measurement apparatus.

Then, reference data RI and measurement data PI of the measurement area FOV are acquired in step of S120.

The reference data RI may correspond to, for example, a theoretical plan image of the board as shown in FIG. 2. In an exemplary embodiment, the reference data RI may be obtained from CAD information or gerber information in which a shape of the board is recorded. The CAD information or the gerber information may include design information of the board, and typically include configuration information of a pad 10, a circuit pattern 30, a hole pattern 40, etc.

In another exemplary embodiment, the reference data RI may be acquired from learning information that is obtained in a learning mode. The learning mode may be realized by processes, for example, such as searching board information in a database, learning a bare board in case that the board information is not in the database, and storing the board information in the database after the board information is produced by learning the bare board. That is, in the learning mode, a bare board of a PCB is learned and design reference information of the PCB is acquired, and the reference data RI may be acquired by obtaining the learning information through the learning mode.

The measurement data PI may be, for example, a real captured image for a PCB, in which a component 20 mounted on the board, a terminal 22, a polar indication 24 formed at the component 20, a circuit pattern 30, a hole 42, etc. are shown. The measurement data PI has, as shown in FIG. 3, the same image as the reference data RI shown in FIG. 2 except for additional elements such as the component 20. However, the measurement data PI is distorted in comparison with the reference data RI, due to warpage, contortion, etc. of the board.

In an exemplary embodiment, the measurement data PI may be acquired by providing light onto the measurement area FOV using the illumination section of the inspection apparatus, and capturing an image reflected by the provided light using a camera installed in the inspection apparatus. Alternatively, the measurement data PI may be acquired by projecting grating pattern light onto the measurement area FOV using a grating pattern projecting section of the inspection apparatus, capturing an image reflected by the projected grating pattern light to obtain data for a three-dimensional shape, and averaging the data for the three-dimensional shape.

Then, a plurality of feature block feature blocks is established to include a predetermined shape in the measurement area FOV by a block unit in step of S130.

In order to acquire a distortion degree by comparing the reference data RI with the measurement data PI, which will be described later, a target for comparison is required, and the target for comparison is defined as a feature object. In the present step, the feature object is established as a feature block of a block unit.

The predetermined shape of each feature block may have a two-dimensional identifier capable of defining a two-dimensional plane so that misidentification probability due to a surrounding shape is removed. For example, the two-dimensional identifier may variously include a bent line, a quadrangle, a circle, combinations thereof, etc., and a straight line may not be included in the two-dimensional identifier because the straight line is not capable of defining a two-dimensional plane.

When the reference data RI and the measurement data PI are compared with each other, a corner of a bent pattern, a circle, a hole, etc., which conventionally serve as a feature object, may be misidentified by a corner of an adjacent bent pattern, an adjacent circle, an adjacent hole, etc., respectively.

Thus, in case that the feature block serves as a feature object instead of just establishing a corner of a bent pattern, a circle 40, a hole 42, etc. as a feature object, the feature block has the predetermined shape, and the predetermined shape is very various, and thus misidentification probability may be greatly reduced.

For example, the predetermined shape may have at least one of a bent pattern and a hole pattern.

The plurality of feature blocks may be established as follows.

After finding a location of a corner of a bent circuit pattern corresponding to the predetermined shape, a margin area of the corner of the bent circuit pattern is established and the feature blocks defined by the established margin area is established.

In an exemplary embodiment, as shown in FIG. 3, first to eighth feature blocks FB1, FB2, FB3, FB4, FB5, FB6, FB7 and FB8 may be established.

Thereafter, a merged block is established by merging feature blocks overlapped in the feature blocks in step of S140.

In order to establish the merged block, firstly, margin areas of the overlapped feature blocks are merged, and then the merged block is established by extracting a minimum quadrangle of the merged margin areas.

In an exemplary embodiment, as shown in FIG. 3, a first merged block MB1 may be established by merging the overlapped first and second feature blocks FB1 and FB2, and a second merged block MB2 may be established by merging the overlapped third and fourth feature blocks FB3 and FB4.

As shown in FIGS. 2 and 3, the feature blocks may be established in the reference data RI, and the merged block of the feature blocks may be established in the measurement data PI. In other words, the feature blocks may be established in the reference data RI, and a matching shape with a shape within the feature blocks may be found in the measurement data PI. Alternatively, the feature blocks may be established in the measurement data PI, and the merged block of the feature blocks may be established in the reference data RI.

Although the shape within the feature block expressed in the measurement data PI is a little deviated in comparison with the reference data RI due to warpage and contortion of the board, in case that the merged block is established and the measurement data PI and the reference data RI are compared with each other by a unit of the merged block, as described above, misidentification probability due to a similar surrounding shape may be greatly reduced.

Particularly, in case of establishing a feature block within which the same shape repetitively exists around, when comparing shapes in the feature block corresponding to the reference data RI and the measurement data PI with each other, an error may occur that an object capable of serving as a comparison target is identified wrong. However, in case that the merged block is established and the measurement data PI and the reference data RI are compared with each other by a unit of the merged block, as described above, misidentification probability due to a similar surrounding shape may be greatly reduced.

For example, since the first feature block FB1 and the second feature block FB2 have similar shapes to each other, in case that the shape within the feature block of the measurement data PI is a little deviated from the shape within the feature block of the reference data RI due to warpage and contortion of the board, it may be probable to misidentify one another. However, when compared by using a first merged block MB1, misidentification probability may be greatly reduced.

Thereafter, a distortion degree is acquired by comparing reference data and measurement data corresponding to a feature block except for the merged block and/or the merged block in step of S150.

In FIG. 3, a distortion degree may be acquired by comparing the reference data RI and the measurement data PI corresponding to feature blocks FB5, FB6, FB7 and FB8 except for the merged blocks MB1 and MB2 and/or the merged blocks MB1 and MB2.

A target block for comparing the reference data RI and the measurement data PI with each other (hereinafter, referred to as "comparison block") is extracted from the blocks, and then the distortion degree may be acquired by using the extracted comparison block.

In FIG. 3, after the comparison block is extracted from the feature blocks FB5, FB6, FB7 and FB8 except for the merged blocks MB1 and MB2 and/or the merged blocks MB1 and MB2, a distortion degree may be acquired by comparing the reference data RI and the measurement data PI corresponding to the extracted comparison block.

In an exemplary embodiment, the extracted comparison block may be plural, and the comparison blocks may be extracted to be evenly distributed in the measurement area FOV. The even distribution in the measurement area FOV may be defined by a work such as an image processing according to various geometrical criteria. For example, in case that the reference number is four, and the measurement area FOV has a rectangular shape, the feature block nearest to each corner of the measurement area FOV may be extracted to serve as the comparison block, and the remainder is excluded from extraction.

In FIG. 3, for example, the comparison block may be extracted as the first merged block MB1, the fifth feature block FB5 and the seventh feature block FB7.

More particularly, in case that the measurement area FOV has a rectangular shape, the rectangular shaped measurement area FOV is divided into 9 sub-rectangles of a 3×3 matrix form, and thereafter the feature block existing in the sub-rectangle corresponding to each corner may be preferentially extracted as the comparison block. Thus, the comparison blocks may be extracted to be evenly distributed in the measurement area FOV.

In another exemplary embodiment, the extracted comparison block may be plural. The reference data RI and the measurement data PI are compared with each other to give a score, and then the comparison blocks may be extracted based on the given score.

In FIG. 3, a greater score is given to the feature block or the merged block, which has a smaller shape difference between the reference data RI and the measurement data PI, among the feature blocks FB5, FB6, FB7 and FB8 except for the merged blocks MB1 and MB2 and/or the merged blocks MB1 and MB2. That is, the score may express a degree of shape coincidence in comparing the reference data RI with the measurement data PI.

For example, the score may be established based on the number of coincident pixels in defining the shape as a unit of a pixel, a degree of coincidence in at least one of intensity, saturation and hue when comparing the reference data RI and the measurement data PI, a transformation degree and an angle. As for a hole, the score may be established based on a degree to which a shape of the hole is transformed in x and y directions. In this case, the blocks having a great score may be established as the comparison block.

In case that the number of the merged feature blocks is greater than or equal to a predetermined reference number, the merged block acquired by the merged feature blocks may be excluded from extracting the comparison block. As the number of the merged feature blocks increases, the size of the merged block also increases. Accordingly, time of comparing the reference data RI with the measurement data PI corresponding to the merged block greatly increases. Thus, the merged block formed by the feature blocks greater than or equal to the reference number may be excluded from the extraction of the comparison block. For example, the reference number may be three or four.

For similar reasons, in case that the sizes of the feature blocks are the same, the feature block not merged is preferentially extracted, the merged block may be extracted in order of smallness of the merged number of the merged block. In addition, in case that the sizes of the feature blocks are different from each other, the feature block may be preferentially extracted in order of small size thereof.

In order to extract the comparison block, a first criterion of extracting to be evenly distributed in the measurement area FOV, a second criterion of using the score and a third criterion of considering the size of the feature block, which are described above, may be selectively or entirely applied. In addition, combinations of the criteria may be considered, or the criteria may be sequentially considered according to a preferential order.

In an exemplary embodiment, in order to extract the comparison block, whether the feature block is located at the corner area of the measurement area FOV, the score, and the size of the feature block may be sequentially considered, and accordingly, the feature block may be selected and extracted.

The distortion degree may be expressed as a conversion relation between the reference data RI and the measurement data PI corresponding to the comparison block, and the conversion relation may include a quantified conversion formula between the reference data RI and the measurement data PI.

The measurement data PI is distorted due to warpage, contortion, etc. of the board in comparison with the reference data RI corresponding to theoretical reference information. The conversion formula corresponds to a formula converting the reference data RI and the measurement data PI into each other so as to express a degree of the distortion, i.e., the distortion degree. The quantified conversion formula may be determined by using at least one of a location change, a slope change, a size change and a transformation degree, which are acquired by comparing the reference data RI and the measurement data PI corresponding to the comparison block with each other.

For example, the conversion formula may be acquired by using Equation 1.

$$P_{CAD} f(tm) = P_{real} \qquad \text{Equation 1}$$

In Equation 1, $P_{CAD}$ is a coordinate of a target in CAD information or gerber information, i.e., a coordinate in the reference data RI, f(tm) corresponds to the conversion formula serving as a conversion matrix or a transfer matrix, and $P_{real}$ is a coordinate of the target in the measurement data PI, which is acquired by a camera. When the theoretical coordinate $P_{CAD}$ in the reference data RI and the real coordinate $P_{real}$ in the measurement data PI are found, the conversion matrix may be known.

For example, the conversion matrix may include a coordinate conversion matrix according to an affine conversion or a perspective conversion, in which point-to-point relation is expressed as a first-order form in an n-dimensional space. In order to define the coordinate conversion matrix, the number of the comparison blocks may be properly established, for example, more than or equal to three in case of an affine conversion and more than or equal to four in case of a perspective conversion.

Then, the distortion degree is compensated for to set an inspection area in the target measurement area in step of S160.

Since the distortion degree indicates a degree of distortion generated in the measurement data PI in comparison with the reference data RI, the shape in the inspection area may be more similar to a real shape for the board by compensating for the distortion degree. The inspection area may be set for the entire area of the measurement area FOV, and may be set for only a predetermined area of the measurement area FOV.

After the distortion degree is compensated for to set the inspection area in the measurement data PI, it may be correctly inspected whether a component is bad or not in the inspection area. In the inspection, the measurement data PI may be used, which is previously acquired in the step of acquiring the measurement data PI for the measurement area FOV (step S130).

Thereafter, selectively, it may be verified whether the set inspection area is valid or not. The feature block or the merged block that does not serve as the comparison block may be used for verification.

According to the above, feature blocks are established by a block unit to include a predetermined shape in a measurement area FOV set on a board, and a merged block is established by merging overlapped feature blocks among the feature blocks, thereby acquiring a distortion degree by comparing reference data RI and measurement data PI and compensating for the distortion degree. Therefore, an inspection area may be more correctly set.

In addition, the overlapped feature blocks are merged to remove misidentification probability between similar shapes. Thus, a feature object may be more effectively selected.

In addition, a work such as an inspection of components may be performed based on the measurement area FOV set as described above, to thereby more correctly judge whether the board is good or bad.

As described above, the board inspection apparatus includes a plurality of work stages, and performs a board inspection independently for each work stage, to thereby greatly reduce time required for inspecting a board. In addition, an optical module moving part for moving an optical module including projecting parts is disposed over the optical module, and an image capturing part receiving grating pattern light generated from the projecting part is disposed at a side portion of the projecting part, to secure a space, which become small due to installing the work stages.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An inspection method comprising:
setting a measurement area on a board;
acquiring reference data and measurement data of the measurement area;
establishing a plurality of feature blocks by a block unit so as to include a predetermined shape in the measurement area;
establishing a merged block by merging feature blocks overlapped in the feature blocks;
acquiring a distortion degree by comparing the reference data and the measurement data corresponding to a non-merged block and/or the merged block; and
compensating for the distortion degree to set an inspection area in the target measurement area,
wherein establishing the plurality of feature blocks by the block unit so as to include the predetermined shape in the measurement area includes:
finding a location of a corner of a bent circuit pattern corresponding to the predetermined shape; and
establishing a margin area of the corner of the bent circuit pattern and establishing the feature blocks defined by the established margin area.

2. The inspection method of claim 1, wherein establishing the merged block by merging feature blocks overlapped in the feature blocks includes:
merging margin areas of the overlapped feature blocks; and
establishing the merged block by extracting a minimum quadrangle of the merged margin areas.

3. An inspection method comprising:
setting a measurement area on a board;
acquiring reference data and measurement data of the measurement area;
establishing a plurality of feature blocks by a block unit so as to include a predetermined shape in the measurement area;
establishing a merged block by merging feature blocks overlapped in the feature blocks when the feature blocks have a same shape;
acquiring a distortion degree by comparing the reference data and the measurement data corresponding to a non-merged block and/or the merged block; and
compensating for the distortion degree to set an inspection area in the target measurement area,
wherein acquiring the distortion degree by comparing the reference data and the measurement data corresponding to a non-merged block and/or the merged block includes:
extracting a comparison block from the non-merged block and/or the merged block; and
acquiring the distortion degree by comparing the reference data and the measurement data corresponding to the extracted comparison block with each other,
wherein the extracted comparison block is plural,
wherein a greater score is given to the feature block or the merged block, which has a smaller shape difference between the reference data and the measurement data, among the non-merged block and/or the merged block, and
wherein the comparison block is extracted based on the score.

4. The inspection method of claim 3, wherein the predetermined shape in the measurement area includes at least one of a bent pattern and a hole pattern.

5. The inspection method of claim 3, wherein the extracted comparison block is plural, and the comparison blocks are extracted to be evenly distributed in the measurement area.

6. The inspection method of claim 3, wherein the distortion degree is acquired as a quantified conversion formula between the reference data and the measurement data corresponding to the comparison block, and
the quantified conversion formula is determined by using at least one of a location change, a slope change, a size change and a transformation degree, which are acquired by comparing the reference data and the measurement data corresponding to the comparison block with each other.

7. The inspection method of claim 3, wherein the predetermined shape of each feature block has a two-dimensional identifier so that misidentification probability due to a surrounding shape is removed.

8. An inspection method comprising:
  setting a measurement area on a board;
  acquiring reference data and measurement data of the measurement area;
  establishing a plurality of feature blocks by a block unit so as to include a predetermined shape in the measurement area;
  establishing a merged block by merging feature blocks overlapped in the feature blocks when the feature blocks have a same shape;
  acquiring a distortion degree by comparing the reference data and the measurement data corresponding to a non-merged block and/or the merged block; and
  compensating for the distortion degree to set an inspection area in the target measurement area,
  wherein acquiring the distortion degree by comparing the reference data and the measurement data corresponding to a non-merged block and/or the merged block includes:
    extracting a comparison block from the non-merged block and/or the merged block; and
    acquiring the distortion degree by comparing the reference data and the measurement data corresponding to the extracted comparison block with each other, and
  wherein in case that the number of the merged feature blocks is greater than or equal to a predetermined reference number, the merged block acquired by the merged feature blocks is excluded from extracting the comparison block.

9. The inspection method of claim 8, wherein the predetermined shape in the measurement area includes at least one of a bent pattern and a hole pattern.

10. The inspection method of claim 8, wherein the extracted comparison block is plural, and the comparison blocks are extracted to be evenly distributed in the measurement area.

11. The inspection method of claim 8, wherein the distortion degree is acquired as a quantified conversion formula between the reference data and the measurement data corresponding to the comparison block, and
  the quantified conversion formula is determined by using at least one of a location change, a slope change, a size change and a transformation degree, which are acquired by comparing the reference data and the measurement data corresponding to the comparison block with each other.

12. The inspection method of claim 8, wherein the predetermined shape of each feature block has a two-dimensional identifier so that misidentification probability due to a surrounding shape is removed.

* * * * *